US008875618B2

(12) United States Patent
Boussemart et al.

(10) Patent No.: US 8,875,618 B2
(45) Date of Patent: *Nov. 4, 2014

(54) APPLIANCE FOR FINE STEAM-FROTHING A MILK-BASED LIQUID

(75) Inventors: Christophe S. Boussemart, Lugrin (FR); Alexa Perrin, Pully (CH)

(73) Assignee: Nestec S.A., Vevey (CH)

(*) Notice: Subject to any disclaimer, the term of this patent is extended or adjusted under 35 U.S.C. 154(b) by 548 days.

This patent is subject to a terminal disclaimer.

(21) Appl. No.: 13/059,384

(22) PCT Filed: Aug. 31, 2009

(86) PCT No.: PCT/EP2009/061212
§ 371 (c)(1),
(2), (4) Date: Feb. 16, 2011

(87) PCT Pub. No.: WO2010/023313
PCT Pub. Date: Mar. 4, 2010

(65) Prior Publication Data
US 2011/0162534 A1    Jul. 7, 2011

(30) Foreign Application Priority Data
Sep. 1, 2008  (EP) .................................... 08163423

(51) Int. Cl.
A23F 3/00       (2006.01)
A47J 43/046     (2006.01)
A47J 31/44      (2006.01)

(52) U.S. Cl.
CPC ............ *A47J 31/4489* (2013.01); *A47J 43/046* (2013.01)
USPC ........................................................ 99/323.1

(58) Field of Classification Search
USPC ........................... 99/323.1, 294, 453; 366/148
See application file for complete search history.

(56) References Cited

U.S. PATENT DOCUMENTS

| 2,932,493 A | 4/1960 | Jacobs ........................... 259/102 |
| 3,182,975 A | 5/1965 | Stewart, Jr. ...................... 261/34 |
| 3,356,349 A | 12/1967 | Keppler ........................ 259/111 |
| 4,162,855 A | 7/1979 | Bender .......................... 366/274 |
| 4,479,908 A | 10/1984 | Arbeillé et al. .................. 261/62 |
| 4,537,332 A | 8/1985 | Brown et al. .................. 222/190 |
| 5,133,247 A | 7/1992 | Pastrick ........................... 99/295 |

(Continued)

FOREIGN PATENT DOCUMENTS

| DE | 1 131 372 | 6/1962 |
| DE | 1 554 670 | 2/1970 |

(Continued)

OTHER PUBLICATIONS

International Search Report and Written Opinion, application No. PCT/EP2009/061212, mailed Jan. 19, 2010.

(Continued)

*Primary Examiner* — Dana Ross
*Assistant Examiner* — Renee L Miller
(74) *Attorney, Agent, or Firm* — Winston & Strawn LLP

(57) ABSTRACT

An appliance for heating and frothing a milk-containing liquid. The appliance includes a steam supply arrangement having an outlet with an opening for delivering into the milk-containing liquid bubbles of steam. The outlet is associated with a valve for adjusting the bubble size of the steam bubbles delivered into the liquid from the steam outlet opening.

20 Claims, 2 Drawing Sheets

(56) References Cited

U.S. PATENT DOCUMENTS

| | | | |
|---|---|---|---|
| 5,265,519 A | 11/1993 | Schiettecatte et al. | 99/293 |
| 5,295,431 A | 3/1994 | Schiettecatte et al. | 99/293 |
| 5,473,972 A | 12/1995 | Rizzuto et al. | 99/290 |
| 5,638,740 A * | 6/1997 | Cai | 99/295 |
| 6,006,654 A | 12/1999 | Pugh | 99/293 |
| 6,318,247 B1 | 11/2001 | Di Nunzio et al. | 99/348 |
| 6,712,497 B2 | 3/2004 | Jersey et al. | 366/274 |
| 6,901,848 B2 * | 6/2005 | Beretta | 99/453 |
| 7,021,206 B2 | 4/2006 | Eckenhausen et al. | 99/452 |
| 7,314,307 B2 * | 1/2008 | Cai | 366/273 |
| 7,322,282 B2 | 1/2008 | Frigeri | 99/453 |
| 2001/0036124 A1 | 11/2001 | Rubenstein | 366/205 |
| 2002/0134248 A1 | 9/2002 | Eugster | 99/275 |
| 2003/0106433 A1 | 6/2003 | Oldani et al. | 99/279 |
| 2004/0107843 A1 | 6/2004 | Oldani et al. | 99/452 |
| 2005/0115419 A1 | 6/2005 | Oldani et al. | 99/453 |
| 2006/0018187 A1 | 1/2006 | Donna et al. | 366/129 |
| 2008/0168907 A1 | 7/2008 | Shen et al. | 99/294 |
| 2009/0101021 A1 * | 4/2009 | Tonelli et al. | 99/290 |

FOREIGN PATENT DOCUMENTS

| | | |
|---|---|---|
| DE | 89 15 094 U1 | 3/1990 |
| DE | 40 37 366 A1 | 5/1992 |
| DE | 44 45 436 A1 | 6/1996 |
| DE | 195 45 111 A1 | 6/1997 |
| DE | 196 11 450 C1 | 7/1997 |
| DE | 196 24 648 A1 | 1/1998 |
| DE | 197 19 784 C1 | 7/1998 |
| DE | 10 2004 063 285 A1 | 7/2006 |
| DE | 20 2007 009 537 U1 | 10/2007 |
| DE | 10 2006 031 064 B3 | 1/2008 |
| EP | 0 344 859 A1 | 12/1989 |
| EP | 0 480 928 B1 | 4/1992 |
| EP | 0 607 759 A1 | 7/1994 |
| EP | 0 791 321 A1 | 8/1997 |
| EP | 0 813 834 A1 | 12/1997 |
| EP | 0 858 757 A1 | 8/1998 |
| EP | 1 197 175 A1 | 4/2002 |
| EP | 1 223 839 B1 | 7/2002 |
| EP | 1 501 398 B1 | 2/2005 |
| EP | 1 597 992 A1 | 11/2005 |
| EP | 1 656 862 A1 | 5/2006 |
| EP | 1 658 797 A2 | 5/2006 |
| EP | 1 716 796 A1 | 11/2006 |
| EP | 1 725 124 B1 | 11/2006 |
| EP | 1 731 065 A1 | 12/2006 |
| EP | 1 776 904 A1 | 4/2007 |
| EP | 1 776 905 A1 | 4/2007 |
| EP | 1 785 074 A1 | 5/2007 |
| EP | 1 827 188 B1 | 9/2007 |
| EP | 1 857 028 A1 | 11/2007 |
| EP | 1 878 370 A1 | 1/2008 |
| FR | 769 848 | 9/1934 |
| FR | 775 618 | 1/1935 |
| FR | 2 708 185 A3 | 2/1995 |
| WO | WO 90/10411 A1 | 9/1990 |
| WO | WO 96/22830 A1 | 8/1996 |
| WO | WO 01/26520 A2 | 4/2001 |
| WO | WO 01/88187 A1 | 11/2001 |
| WO | WO 01/97668 A1 | 12/2001 |
| WO | WO 03/003888 A1 | 1/2003 |
| WO | WO 2004/043213 A1 | 5/2004 |
| WO | WO 2006/050900 A1 | 5/2006 |
| WO | WO 2006/122916 A1 | 11/2006 |
| WO | WO 2007/095770 A1 | 8/2007 |
| WO | WO 2007/120038 A1 | 10/2007 |
| WO | WO 2007/144735 A2 | 12/2007 |
| WO | WO 2008/034708 A1 | 3/2008 |
| WO | WO 2008/046837 A1 | 4/2008 |
| WO | WO/2008/142154 A1 | 11/2008 |

OTHER PUBLICATIONS

International Search Report and Written Opinion, application No. PCT/EP2009/061209, mailed Oct. 19, 2009.

* cited by examiner

APPLIANCE FOR FINE STEAM-FROTHING A MILK-BASED LIQUID

This application is a 371 filing of International Patent Application PCT/EP2009/061212 Filed Aug. 31, 2009.

FIELD OF THE INVENTION

The present invention relates to an appliance for frothing a milk-based liquid to be used, for example, in the context of the preparation of beverages such as cappuccinos, milky coffees, café latte and macchiato, chocolate and other hot beverages.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid.

Various systems are known to condition fresh milk. Such prior art systems are for example disclosed in DE 11 31 372, DE 15 54 670, DE 196 11 450, DE 196 24 648, DE 197 19 784, DE 40 37 366, DE 44 45 436, DE 89 15 094, DE 20 2007 009 537, DE 10 2004 063 285, DE 10 2006 031 064, EP 0 344 859, EP 0 480 928, EP 0 607 759, EP 0 791 321, EP 0 813 834, EP 0 858 757, EP 1 197 175, EP 1 223 839, EP 1 501 398, EP 1 597 992, EP 1 716 796, EP 1 725 124, EP 1 731 065, EP 1 776 904, EP 1 776 905, EP 1 785 074, EP 1 827 188, EP 1 857 028, EP 1 878 370, FR 769 848, FR 2 708 185, U.S. Pat. No. 2,932,493, U.S. Pat. No. 3,182,975, U.S. Pat. No. 3,356,349, U.S. Pat. No. 4,162,855, U.S. Pat. No. 4,537,332, U.S. Pat. No. 4,479,908, U.S. Pat. No. 5,133,247, U.S. Pat. No. 5,265,519, U.S. Pat. No. 5,295,431, U.S. Pat. No. 5,473,972, U.S. Pat. No. 6,006,654, U.S. Pat. No. 6,318,247, U.S. Pat. No. 6,712,497, U.S. Pat. No. 7,021,206, U.S. Pat. No. 7,322,282, US2002/0134248, WO 90/10411, WO 96/22830, WO 03/003888, WO 2004/043213, WO 2006/050900, WO 2006/122916, WO 2007/095770, WO 2007/120038, WO 2007/144735, WO 2008/034708, WO 2008/046837 and WO/2008/142154. Conditioning systems for other applications, such as tea, coffee, hot chocolate, soup, salad dressing, etc. . . . are disclosed in US 2001/0036124, US 2006/0018187 and U.S. Pat. No. 7,314,307.

The simplest method to froth milk consists in plunging a steam supply pipe into a cup of milk to be frothed. However, the results of such a method depend largely on the skills of the user and generally provide a poor froth quality. In fact, usually, milk ends up merely heated and not significantly frothed for lack of air incorporation into the milk during the conditioning treatment. Indeed, for achieving an acceptable frothing, the user is expected to skillfully move the steaming pipe in the milk so as to agitate it at the same time for simultaneous incorporation of air into the milk. Such systems are for instance disclosed in EP 0 791 321 and EP 1 716 796. The mere heating by vapour without frothing of milk is well known and may also be achieved automatically, for instance as disclosed in EP 776 904. In particular, a vapour source may be combined with a stirrer to avoid burning of milk on the steam injection duct by injecting the vapour into the milk via the stirrer enclosed in a stirring chamber in fluid communication with milk, as for instance disclosed in U.S. Pat. No. 3,182,975 and U.S. Pat. No. 4,479,908.

There are frothing devices that combine a vapour supply pipe for heating and a mechanical stirrer extending therebelow for simultaneously agitating the milk in a cup held by a user under this frothing device. Such a stirrer may be connected via a drive shaft to a drive rotor that is located inside the vapour tube and that is driven by the passage of vapour in the tube. Vapour, or a mixture of vapour and air, is delivered vertically above the stirrer. For example EP 1 197 175 discloses a vapour pipe having a plurality of openings for incoming milk and air and at its outlet a stirrer for agitating the milk. DE 10 2004 063 285 discloses a similar device in which the vapour pipe is arranged for guiding only vapour and is impervious so as to avoid entry of milk into the tube for hygiene reasons. EP 1 597 992 discloses another such device of the same type. In WO 2007/095770 a lance with a Venturi arrangement is arranged to inject a steam-air mixture in a receptacle of milk. A similar arrangement is disclosed in WO 2007/144735.

A problem with such systems comes from the fact that the user has to properly hold the cup under the vapour pipe, or vice versa, so that the pipe's outlet does not emerge from the milk during the treatment which would lead to the projection of milk all over the place. This risk is even increased when such a vapour pipe cooperates with a stirrer located thereunder that can lead to the formation of a vortex in the milk nearby the stirrer and space the pipe's vapour outlet above the surface of the milk which can also lead to the projection of milk in addition to poor or non incorporation of vapour into the milk.

Moreover, the use of interdependent stirrers, vapour and/or air injection means, such as systems using a Venturi arrangement or systems having a stirrer driven by the injected vapour, have a very limited versatility. Normally, they allow only one mode of operation and require the user's skills, e.g. motion of the frothing arrangement and/or of the receptacle to adjust the frothing characteristics.

One solution to this latter problem has been proposed in EP 1 501 398 in which vapour is mixed with air in a ratio determined by the user and then injected as a mixture into a receptacle containing milk. The vapour-air ratio is adjusted with the view to heat the milk with a user-adjusted amount of froth. EP 1 776 905 discloses a similar system in which pulses of compressed air are incorporated into a flow of vapour and then injected as a mixture into a jug of milk. A further system of the same type is disclosed in U.S. Pat. No. 6,006,654 in which milk is pumped into a vapour stream and then mixed with air for frothing and then delivered at a discharge nozzle.

Milk may also be frothed by sucking fresh milk from a milk source into a device that includes an air inlet and a pressurised vapour inlet forming a Venturi arrangement, for heating and mixing such milk with vapour and air, and an outlet for the thereby frothed milk. Such devices are for example disclosed in the abovementioned EP 1 716 796, DE 10 2006 031 064 and DE 44 45 436. Such systems may also be combined with an in-line stirrer, as for example disclosed in DE 20 2007 009 537. Furthermore, in EP 1 785 074 milk is pumped from a reservoir into a mixing chamber into which a mixture or vapour and milk is injected for frothing the milk, and then the frothed milk is delivered to a delivery opening.

Another known approach involves the use of a frothing receptacle which comprises a frothing arrangement and into which milk is supplied and then frothed. The frothing may be carried out by injecting vapour and air with a Venturi arrangement into the milk contained in the receptacle, for instance as disclosed in WO 01/26520 and WO 2006/122916. This system produces frothed milk with a relatively liquid foam having large bubbles. Frothing of milk in a tank can also be achieved by an impeller for mechanically agitating and driving air into the milk and a resistive heater for heating the milk at the same time, as for example disclosed in EP 1 725 124, WO 2006/050900 and WO/2008/142154. This system produces a relatively dry firm foam with large bubbles as well.

A problem involved with the suction of milk in a Venturi-type vapour arrangement is the immediate condensation of vapour in the Venturi arrangement and the poor formation of vapour bubbles in the milk.

There is therefore still a need to provide a reliable system that is simple for producing frothed milk and that has a high quality fine bubble distribution.

SUMMARY OF THE INVENTION

Therefore, the invention relates to an appliance for heating and frothing a milk-containing liquid. This appliance has a steam supply arrangement having an outlet with an opening for delivering into this milk-containing liquid steam bubbles having a certain bubble size.

The steam delivered into the milk-containing liquid causes heating of the liquid. However, unlike known Venturi arrangements, water is injected in the form of steam bubbles directly into the milk-containing liquid. This steam does not serve to suck milk into a frothing pipe arrangement whereby the steam is largely condensed into liquid water in this sucking process within the Venturi arrangement. Rather, with the steam supply arrangement of the present invention, the steam is incorporated in the form of generally gaseous bubbles into the milk-containing liquid.

In accordance with the invention, the appliance's outlet is associated with a valve means for adjusting the bubble size of said steam bubbles delivered into said liquid from the steam outlet opening, the steam outlet opening having in particular a section which is adjustable by the valve means.

Hence, by adjusting the characteristics of the valve, in particular by regulating the flow of steam through the valve, the characteristics of the resulting frothed milk-containing liquid are influenced correspondingly, in particular the size of the pores in the frothed milk which depends on the size of the injected steam bubbles can be adjusted to reach a desired foam quality.

In particular, it has been found that injecting steam with a very fine bubble size into the milk-containing liquid, for instance by forcing the steam under pressure through a resilient valve member at the steam outlet opening, a foam quality close to the one obtained manually by the barista or highly skilled coffee sommelier, e.g. a foam with bubbles around approx. 150 micron can be obtained, instead of a pore size at or above approx. 200 micron obtained with the known automatic milk frothers.

For instance, the valve means comprise a biased resilient member arranged to allow a release of steam through the outlet opening when such steam reaches a sufficient pressure in the steam supply arrangement. The resilient member is optionally associated with a user-adjustable bias means for adjusting the resilient member's bias. For instance, the valve means include at least one of a lid, plug or cover resiliently closing the steam outlet opening.

The valve means may comprise a resilient section, in particular a tubular or conical section, for guiding such steam towards the steam outlet opening. This resilient section can be part of the steam outlet and the valve means may further comprise means for squeezing this resilient section to regulate the steam flow therethrough. Typically, the valve means further comprise a retaining surface, the resilient section being biased to urge the outlet opening against the retaining surface. In this case, a steam pressure may build up behind the valve to a level necessary to force the passage along the resilient section through the outlet opening and thus inject vapour bubbles with an adjusted size into the milk-containing liquid.

The appliance can also include a one-way valve or a non-return valve to prevent the introduction of the milk-containing liquid into the steam supply arrangement, in particular into its outlet. The valve for adjusting the bubble size may itself be a one-way valve or a non-return valve.

Usually, the appliance also comprises means for incorporating air into the milk-containing liquid, in particular means for incorporating air into this liquid at a distance from the steam outlet opening so as to form steam bubbles at the steam outlet opening separately from air bubbles that are being formed by the air incorporation means. The air bubbles introduced into said liquid are thus distinct from steam bubbles formed at the steam outlet opening.

By separating the steam and the air incorporation into the milk-containing liquid, especially during the entire frothing process, the properties of the bubbles of steam and the bubbles of air are not modified before or at incorporation into the milk-containing liquid.

It has been found experimentally that the interaction of air bubbles and vapour bubbles upon incorporation into the milk-containing liquid, produces a higher froth quality than when air and vapour are mixed together before incorporation into the milk-containing liquid. Even though the physical and/or chemical phenomenons are not as yet well understood, and without being bound to any theory, it is believed that milk, in particular the conditioning of the milk proteins which is believed to influence directly the characteristics of the milk-containing foam, reacts differently when exposed to (especially substantially non-condensed) steam and air separately than when the milk-containing liquid is treated with a pre-mix of air and steam or, even worse, air and condensed steam (hot water). The entire separation of the processes of air incorporation and of steam incorporation leads to the improved froth quality.

The air incorporation means typically comprise an agitator for agitating the milk-containing liquid and incorporating the air by the agitation. The agitator may be a stirrer arranged to be immersed into the milk-containing liquid and stir it, as for instance disclosed in the abovementioned WO2006/050900 and WO/2008/142154. It is also contemplated to agitate the milk-containing liquid by using a shaker-type arrangement for incorporating air bubbles into the liquid. Furthermore, air may also be incorporated into the liquid by using a an air supply duct, optionally associated with an air pump, directly into the milk-containing liquid, or in a less preferred embodiment, as explained above, by pre-mixing the steam and the air before incorporation into the milk-containing liquid.

To increase the flexibility and user-adaptability, the appliance can be arranged to be user-configurable for incorporating air and steam simultaneously and/or sequentially while frothing the milk-containing liquid. The appliance may also be arranged to let the user choose the velocity of incorporation of air and/or steam into the milk-containing liquid. Optionally, the air incorporation means can be associated with a resistor heater for heating the milk-containing liquid in combination or without steam heating. Hence, a user may adjust the characteristics of the desired froth, in particular the fluidity and dryness thereof, as well as the foam structure by reducing or suppressing the steam incorporation and compensating the lack of steam heating by a resistor heating of the milk-containing liquid, for example a resistor assembled to a reservoir for containing the liquid or to the agitator.

The appliance may comprise a reservoir for containing the milk-containing liquid. The steam supply arrangement is optionally secured, in particular mechanically secured, to the reservoir. Typically, the receptacle has a bottom surface, the steam outlet opening can be located at or adjacent to this bottom surface. Normally, the appliance comprises an agitator, for instance of the stirrer type, for agitating the milk-containing liquid and incorporating air thereinto. The agitator is optionally arranged adjacent a bottom of this receptacle.

Advantageously, the agitator is arranged so as to induce an asymmetric motion into the milk-containing liquid within the reservoir. For example, the agitator includes a stirrer that is off-centred with respect to a central vertical axis of the receptacle, whereby an asymmetric agitation can be generated in the body of milk-containing liquid. Alternatively or cumulatively, it is also possible to incorporate flow-perturbation obstacles in the structure of the tank, e.g. protrusion extending into the tank's cavity, so as to generate an asymmetric agitation.

In this case, the steam outlet opening is optionally located generally opposite the agitator in the receptacle in particular adjacent a bottom part of the receptacle. This provides an optimal incorporation of vapour bubbles in the milk-containing liquid at a distance of the stirrer where the incorporation of air bubbles into the liquid takes place.

In one embodiment, the steam supply arrangement comprises a duct with an inlet that is connectable to an outlet of a steam generator, in particular of a hot beverage machine.

In another embodiment, the appliance of the invention comprises a steam generator in fluid connection with said steam supply arrangement. Optionally, the steam generator is arranged to be in thermal communication with the milk-containing liquid for pre-heating thereof in addition to heating by vapour incorporation. For instance, the appliance comprises a reservoir for containing the milk-containing liquid and a water reservoir associated with a heater for the generation of steam, the water reservoir being optionally located around a bottom part of the reservoir for containing the milk-containing liquid.

The invention also relates to an appliance for heating and frothing a milk-containing liquid, in particular an appliance as described above. The appliance comprises a steam supply arrangement having an outlet with an opening for delivering into this liquid bubbles of such steam. At delivery of such bubbles into this liquid, the outlet has a section of up to 0.7 mm$^2$, typically in the range of 0.1 to 0.65 mm$^2$, in particular in the range of 0.2 to 0.55 mm$^2$ such as 0.25 to 0.45 mm$^2$.

This appliance may include any feature or combination of features described above.

BRIEF DESCRIPTION OF THE DRAWINGS

The invention will now be described with reference to the schematic drawings, wherein.

DETAILED DESCRIPTION

Figure 1:
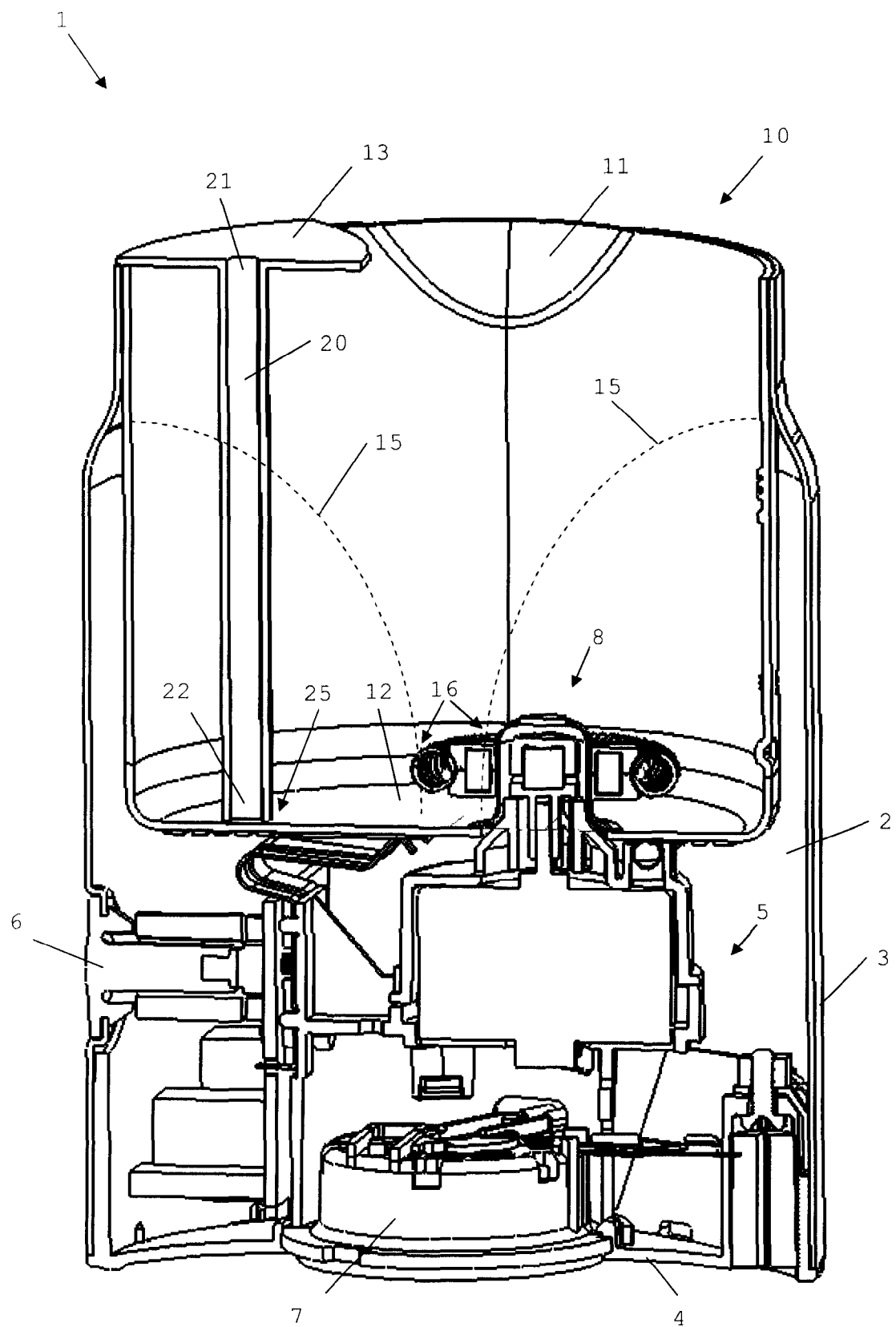
FIG. 1 shows a cross-sectional perspective view of a milk frothing appliance according to the invention.

As shown in FIG. 1, an appliance 1 of the invention has a tank 10 for receiving the milk-containing liquid that is to be frothed. Tank 10 has a spout 11 for dispensing the liquid upon frothing. Furthermore, a closed compartment 2 is located under tank 10 that contains an electric drive arrangement 5 associated with a user-switch 6 and an electric power supply connector 7 for connection to a support base (not shown). Drive arrangement 5 is arranged to drive a stirrer 8 that is located on a bottom 12 of tank 10 and that is magnetically coupled with drive arrangement 5 through bottom 12. Compartment 2 is formed by a generally tubular stand 3 assembled to a rigid bottom 4. The upper part of compartment 2 is delimited by tank which is located inside and secured to stand 3. Thus, tubular stand 3, bottom 4 and tank 10 are three casing parts, which when assembled, form together chamber 2. Further details and variations on the appliance's structure, drive means, switches, electric connector and stirrer are for instance disclosed in WO2006/050900 and in WO/2008/142154, the contents of which are hereby incorporated by way of reference.

Moreover, appliance 1 has an arrangement for the supply of steam comprising a pipe 20 with an inlet 21 for connection to a steam generator (not shown) and an outlet 22 for delivering bubbles of steam at bottom 12 of tank 10. Pipe 20 is secured to tank 10 via a member 13 extending from the upper edge of tank 10.

Pipe 20 is made of resilient material, e.g. a plastic material, and urged under elastic constraint against bottom 12 so that pipe 20, which is compressed along its longitudinal direction, and bottom 12, which forms a retaining surface against the pipe's outlet 22, cooperate together to form a valve system for regulating the bubble size of steam bubbles exiting during use via an adjusted opening 25. Such an opening 25 is formed by the periphery of steam outlet 22 urged against bottom 12 of tank 10. Hence, the outlet opening 25 formed between tube 20 and bottom 12 has a section which is adjusted by the valve means, i.e. tube 20 biased against bottom 12, and the steam under pressure inside and along tube 20 forcing its way out via opening 25.

For operating appliance 1, steam inlet 21 is connected to a steam generator, in particular to the steam nozzle of a coffee machine via a connection pipe, and milk or a milk-containing liquid (not shown) is poured into tank 10.

Off-centred stirrer 8 is made to rotate in the liquid by switching on drive arrangement 5 by pushing button 6. The rotation of stirrer 8 leads to the formation of a vortex at the surface of the liquid. This vortex, shown schematically in dotted lines 15, may extend down to and even below stirrer 8 at start-up. Consequently, air is mechanically incorporated into the liquid by the action of stirrer 8 rotating through the bottom part 16 of surface 15 of the agitated liquid.

Steam is produced by the steam generator and supplied via inlet 21 into pipe 20 and guided therealong to bottom 12. At outlet 22, the steam forces its way under pressure out through opening 25 to form very small steam bubbles in the rotating milk-containing liquid to heat the liquid and to form with the air bubbles a fine emulsion of milk-containing liquid, air and steam and condensed steam.

Figure 2:
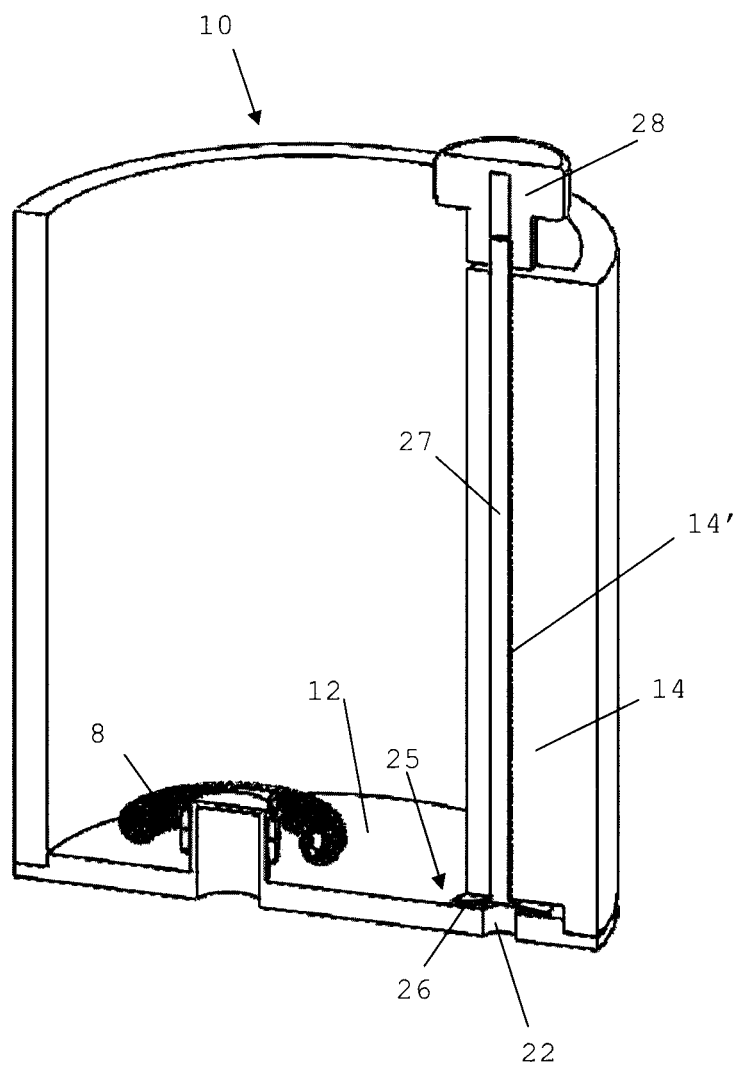
FIG. 2 shows a cross-sectional perspective view of part of another frothing appliance according to the invention.

FIG. 2, in which the same numeric references generally designate the same elements, shows a cross-sectional perspective view of a milk tank 10 of an appliance according to the invention. Tank 10 has on its bottom 12 a stirrer 8 which is rotated by the action of a drive arrangement (not shown) and an outlet 22 of a steam supply arrangement (not shown) for guiding steam from a steam generator into tank 10.

Outlet 22 leads through bottom 12 into tank 10. Outlet 22 is covered with a valve means having a semi-rigid resilient lid 26 and an arrangement 14,14',27,28 for adjusting the mechanical bias of resilient lid 26 against bottom 12.

Lid 26 has a generally flattened conical shape and is urged with its base's periphery against bottom 12 over outlet 22 by a rod 27, bottom 12 acting as a retaining surface for lid 26. Tank 10 has a radial support member 14 with a threaded bore 14' for securing rod 27 that has a corresponding threading. Support member 14 extends vertically substantially along the entire height of tank 10. In a variation, one or more support members in the form of radial fingers may be provided to secure rod 27 instead of this vertically extending support member 14. Moreover, the upper end of rod 27 is assembled to a knob 28 for driving rod 27 up and down bore 14' and allowing the user to adjust the mechanical bias of lid 26 against bottom 12 and thus adjust the characteristics of regulated opening 25 of steam outlet 22 formed under the base's periphery of lid 26.

Outlet 22 is connected to a steam generator via a steam supply arrangement (not shown). The steam generator may be part of the frothing appliance and be located underneath and/or around bottom 12, or the generator may be external to the appliance, as discussed in relation with the embodiment shown in FIG. 1.

The appliance partly shown in FIG. 2 generally operates like the appliance of FIG. 1. Moreover, the valve system 14,14',26,27,28 allows the user to adjust in an simple manner the opening pressure of the steam outlet opening 25 and thus the size of the vapour bubbles delivered from the outlet opening 25 into a batch of milk-containing liquid to be conditioned in tank 10. Valve system 14,14',26,27,28 also acts as a one-way or non-return valve to prevent infiltration of milk-containing liquid into outlet 22 via opening 25.

Moreover, at delivery of the steam bubbles into this liquid, the outlet opening 25 can have a section of about 0.3 or 0.4 to 0.5 or 0.6 mm$^2$.

What is claimed is:

1. An appliance for heating and frothing a milk-containing liquid, comprising a steam supply arrangement having an outlet with an opening for delivering into the liquid bubbles of the steam having a bubble size, wherein the outlet is associated with a valve system for adjusting the opening pressure of the steam outlet opening, thereby varying the bubble size of the steam bubbles delivered into the liquid from the steam outlet opening, wherein the valve system comprises a biased resilient member configured and arranged for adjusting the mechanical bias of a bottom retaining surface of the resilient member against the outlet to allow a release of the steam through the outlet opening when the steam reaches a sufficient pressure in the steam supply arrangement, and wherein the valve system includes a closure member that resiliently closes the steam outlet opening.

2. The appliance of claim 1, wherein the valve is a one-way or non-return valve.

3. The appliance of claim 1, wherein the resilient member is associated with a user-adjustable bias means for adjusting the bias on the resilient member.

4. The appliance of claim 1, wherein the closure member is at least one of a lid, plug or cover.

5. The appliance of claim 1, wherein the valve is a one-way or non-return valve and comprises a resilient tubular or conical section for guiding the steam towards the steam outlet opening.

6. The appliance of claim 5, wherein the resilient section is part of the steam outlet and wherein the valve opening is configured and positioned to regulate steam flow therethrough.

7. The appliance of claim 5, wherein the valve further comprises a retaining surface, with the resilient section being biased to urge the outlet opening against the retaining surface.

8. The appliance of claim 1, which further comprises means for incorporating air into the liquid located at a distance from the steam outlet opening so as to form steam bubbles at the steam outlet opening separately from air bubbles that are being formed by the air incorporation means.

9. The appliance of claim 8, wherein the air incorporation means comprises an agitator, stirrer or shaker for agitating the liquid.

10. The appliance of claim 8, which is arranged to be user-configurable for incorporating air and steam simultaneously or sequentially while frothing the liquid, the air incorporation means being optionally associated with a resistor heater for heating the liquid in combination or without steam heating.

11. The appliance of claim 1, further comprising a reservoir for containing the liquid, with the steam supply arrangement optionally secured to the reservoir and the steam outlet opening optionally located at or adjacent to a bottom surface of the reservoir.

12. The appliance of claim 11, further comprising an agitator for agitating the liquid and incorporation air thereinto, the agitator being optionally arranged adjacent a bottom part of the receptacle.

13. The appliance of claim 12, wherein the agitator is located off-centered relatively to the receptacle, with the steam outlet opening optionally being located generally opposite the agitator in the receptacle adjacent a bottom part of the receptacle.

14. The appliance of claim 1, wherein the steam supply arrangement comprises a duct having an inlet that is connectable to an outlet of a steam generator, with the steam generator optionally associated with a hot beverage machine.

15. The appliance of claim 1, further comprising a steam generator in fluid connection with the steam supply arrangement, with the generator optionally being arranged to be in thermal communication with the liquid for pre-heating thereof.

16. The appliance of claim 1, further comprising a steam supply arrangement having an outlet with an opening for delivering into the liquid bubbles of the steam, wherein at delivery of the bubbles into the liquid, the steam outlet has an opening that has a cross-section of up to 0.7 mm$^2$.

17. The appliance of claim 16, wherein the steam outlet cross-section has a size of 0.1 to 0.65 mm$^2$, 0.2 to 0.55 mm$^2$ or 0.25 to 0.45 mm$^2$.

18. An appliance for heating and frothing a milk-containing liquid, comprising a steam supply arrangement having an outlet with an opening for delivering into the liquid bubbles of the steam having a bubble size, wherein the outlet is associated with a valve for adjusting the opening pressure of the steam outlet opening, thereby varying the bubble size of the steam bubbles delivered into the liquid from the steam outlet opening, wherein the steam outlet opening includes a section which is adjustable by the valve, and the valve comprises a biased resilient member arranged to allow a release of the steam through the outlet opening when the steam reaches a sufficient pressure in the steam supply arrangement, and wherein the valve is a one-way or non-return valve and comprises a resilient tubular or conical section for guiding the steam towards the steam outlet opening and includes a closure member that resiliently closes the steam outlet opening.

19. An appliance for heating and frothing a milk-containing liquid, comprising:
    a steam supply arrangement having an elongated section and an outlet with an opening for delivering into the liquid bubbles of the steam having a bubble size;
    a valve associated with the elongated section and outlet of the steam supply arrangement for adjusting the bubble size of the steam bubbles delivered into the liquid from the steam outlet opening, with the valve comprising a biased resilient member arranged to allow release of the steam through the outlet opening when the steam reaches a sufficient pressure in the steam supply arrangement;

a closure member that resiliently closes the steam outlet opening; and an agitator for agitating the liquid and incorporating air thereinto, the agitator being arranged to be offset from the steam outlet opening for separately forming and introducing air bubbles into the liquid.

20. The appliance of claim 19 wherein the valve is a one-way or non-return valve and comprises a resilient tubular or conical section for guiding the steam towards the steam outlet opening, the resilient section being part of the steam outlet and the valve further comprising a retaining surface, with the resilient section being biased to urge the outlet opening against the retaining surface to control the introduction of steam bubbles into the liquid.

* * * * *